United States Patent
Hau

[11] Patent Number: 5,416,385
[45] Date of Patent: May 16, 1995

[54] MEANS FOR COMPACT SPATIAL OPTICAL INTEGRATION

[75] Inventor: Ronald M. Hau, Cedar Rapids, Iowa

[73] Assignee: Rockwell International Corp., Seal Beach, Calif.

[21] Appl. No.: 116,022

[22] Filed: Sep. 2, 1993

[51] Int. Cl.⁶ .............................. H05B 37/02
[52] U.S. Cl. .................... 315/151; 315/134; 315/149; 315/150; 315/156; 315/158
[58] Field of Search ............... 315/151, 134, 149, 150, 315/156, 158

[56] References Cited

U.S. PATENT DOCUMENTS 4,959,755 9/1990 Hochstein ................. 315/151 X
5,089,749 2/1992 Cadogan ..................... 315/151
5,235,252 8/1993 Blake ........................ 315/151

Primary Examiner—Robert J. Pascal
Assistant Examiner—Reginald A. Ratliff
Attorney, Agent, or Firm—Kyle Eppele; M. Lee Murrah; H. Fredrick Hamann

[57] ABSTRACT

An apparatus and method of controlling the light intensity in a light source of variable emission affected by a drive signal. Spatial optical integration based upon light summation is incorporated into the accompanying encasement device at a backlight source by means of a light source support structure that allows light not directed toward a viewed surface, such as an LCD, to serve as a control input to the light drive signal.

8 Claims, 3 Drawing Sheets

MEANS FOR COMPACT SPATIAL OPTICAL INTEGRATION

BACKGROUND OF THE INVENTION

The present invention relates generally to lighting sources and more particularly to lighting sources employing fluorescent bulbs as a primary illumination source.

Items that utilize backlighting, such as certain medical equipment (X-ray viewing lamps), projection screens and items incorporating Liquid Crystal Displays (LCDS) all require efficient and effective lighting sources. Typically, in such applications, as little as five percent of the emitted light is transmitted to the viewer. Fluorescent lighting sources have received widespread use due primarily to high brightness levels and low heat output characteristics.

Unfortunately, control of the fluorescent light source has proven a major drawback with regards to such use. A fluorescent bulb is very dynamic in nature, presenting the drive circuit a varying impedance at different brightness levels. The impedance determines the input power into the fluorescent bulb and accordingly the output. To complicate matters more, the fluorescent bulb is very temperature sensitive. Light output changes dramatically with temperature variations. These variables have been accommodated in the past, with limited success, by utilizing optical feedback techniques.

Optical feedback generally requires use of a photo sensor on or near the light source, thereby allowing the user to select a light reference level, enabling electronic circuits to control the light output level without further user intervention. This "solution" has presented additional challenges. The fluorescent bulb, during medium to low brightness levels, has bright and dim areas of emissions known as striations. These striations produce a visual flicker in the fluorescent light source when combined with optical feedback. The flicker is normally present at five to one hundred and twenty hertz and is easily detected by display users.

Electrical or time integration has been used to attack this problem, however it has several major drawbacks. First, time integration slows the response of the feedback control circuit, thereby making the backlight control circuit non-responsive to short duration changes in light output. The result is often a slow "pulsing" or "walking" flicker. Second, the backlight control circuit is slow to respond to changes in the light reference level, thereby making adjustment of the light output level difficult.

Spatial optical integration addresses the shortcomings of time integration by averaging the instantaneous light output over the length of the fluorescent bulb. By integrating the emitted light over the length of the tube, the striations are averaged out and the optical feedback "sees" a continuous light level. This technique eliminates flicker, yet allows the feedback circuit to respond instantaneously to variables that impact the overall light output.

Spatial optical integration can be accomplished in a variety of ways. Multiple photodetectors may be used to sense different areas of the fluorescent bulb. The outputs of all the photodetectors can then be summed to get an average light level. This technique is both costly and of limited use, since the value of the "dark" current of the photodetectors is also summed, thereby rendering the feedback circuit ineffective at low brightness levels when it is needed most.

Spatial sampling may also be utilized to perform optical integration. This method utilizes optical fibers to transmit light signals to a single photodetector. This method solves the usability problem at low light levels and replaces it with a costly production problem. Assembling twenty to fifty optical fibers from various points along the fluorescent bulb into a bundle at the photodetector requires special skills and equipment. Furthermore, two to four inches of the instrument's depth are required for the bend radius of the optical fibers.

Accordingly, a need exists for an improved apparatus for controlling the emitted light in particular applications of fluorescent light sources.

SUMMARY OF THE INVENTION

The present invention discloses an apparatus and method of controlling the light intensity in a light source of variable emission affected by a variable drive signal. The technique of spatial optical integration is incorporated into the design of a given light source, thereby providing improved light uniformity. Spatial optical integration based upon light summation is a preferred technique of the present invention.

By carefully designing an encasement device for a given light source, light normally "lost" may be utilized to control the drive signal. The encasement device includes a pedestal for supporting the light source. Light emitted between the source and the pedestal is directed, via a light channel built into the encasement device, to a centrally located photodetector. This allows the optical feedback circuit to adjust the light output instantaneously based on an input signal responsive to the light output.

One embodiment of the above teaching is accomplished through careful reflector design utilizing clear polycarbonates as a material and putting reflective coatings on both the top and bottom surfaces. This apparatus is roughly equivalent in cost to current production reflectors, however, the light channel must be designed as an integral part of the assembly. Commercially available design tools may be utilized to design the light channel in the reflector.

It is an object of the present invention to provide a device utilizing a backlighting source of improved and constant brightness level.

It is a feature of the present invention to provide an apparatus that utilizes light summation to control the input drive signal.

It is an advantage of the present invention that a device utilizing backlighting has improved visibility.

The foregoing as well as other objects, features and advantages of the present invention will become better understood from the following detailed description taken in conjunction with the various views of the appended drawings.

DETAILED DESCRIPTION OF THE DRAWINGS

Figure 1:
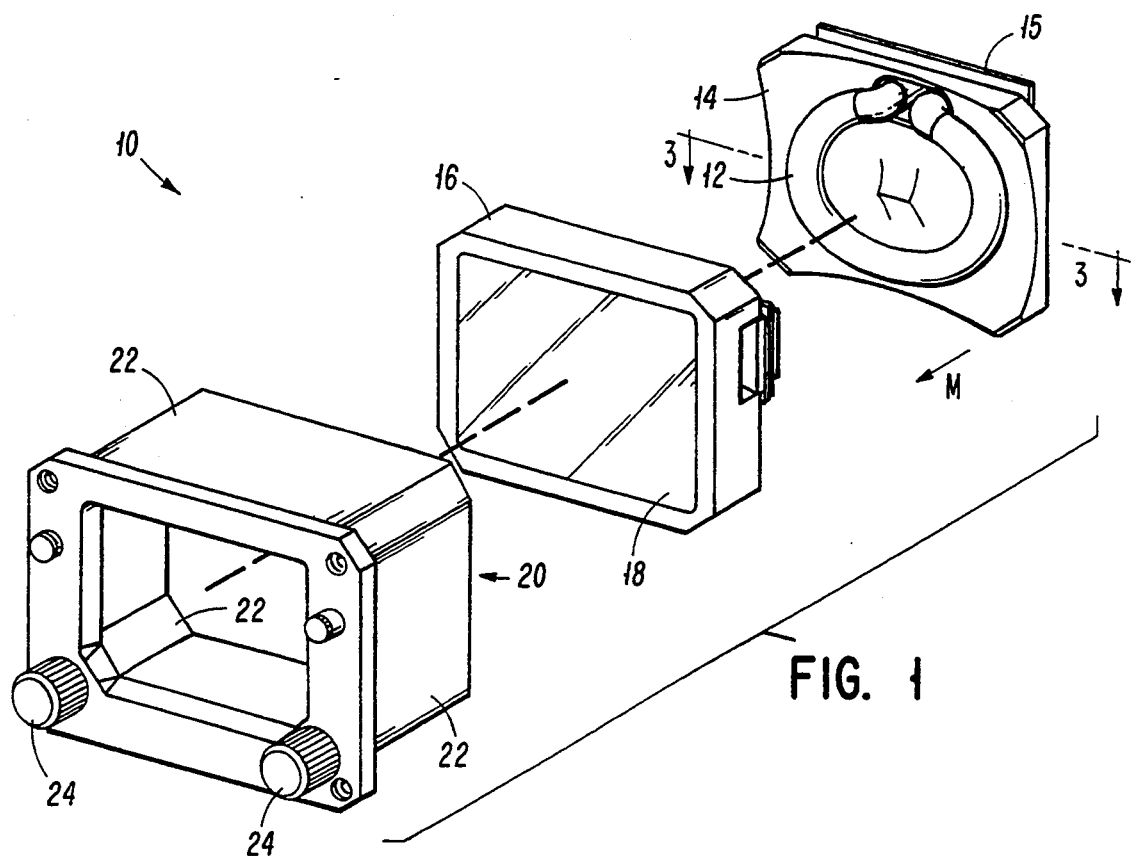
FIG. 1 is an exploded orthogonal view of an avionics flat panel LCD device that incorporates the teachings of the present invention.

Turning now to the Figures wherein like items are referenced as such throughout, FIG. 1 illustrates a device 10 that incorporates the teachings of the present invention. The device 10 is shown to be a flat panel LCD avionic instrument that utilizes a fluorescent bulb 12 as a backlighting source. It should be noted that use of an avionic instrument is for example purposes only and is not a limit on the teachings of the present invention. The device 10 is specifically comprised of a reflector assembly 14, the fluorescent bulb 12, a display head assembly 16, and a display head housing 20. The display head assembly 16 includes a flat panel LCD 18. The display head housing 20 is shown to include a plurality of protruding members 22 for compliantly forming an encasement device for the reflector assembly 14 and the fluorescent bulb 12 with a back plate 15. The protruding members 22 may be comprised of an integral multiwalled element as shown, or a plurality of elements thereby forming a multi-walled structure. The dimensions of protruding members 22 are such that the display head assembly 16, the fluorescent bulb 12, and the reflector assembly 14 fit within the display head housing 20, and that the back plate 15 thereby serves as a back surface. Control knobs 24 are also shown for providing input signals to the device 10, the output of which is provided on the LCD 18. It is understood that the device 10 may include a variety of additional components for monitoring, calculating or otherwise providing displayed information, such components are not shown in FIG. 1 and are not necessary for understanding the teachings of the present invention.

Figure 2:
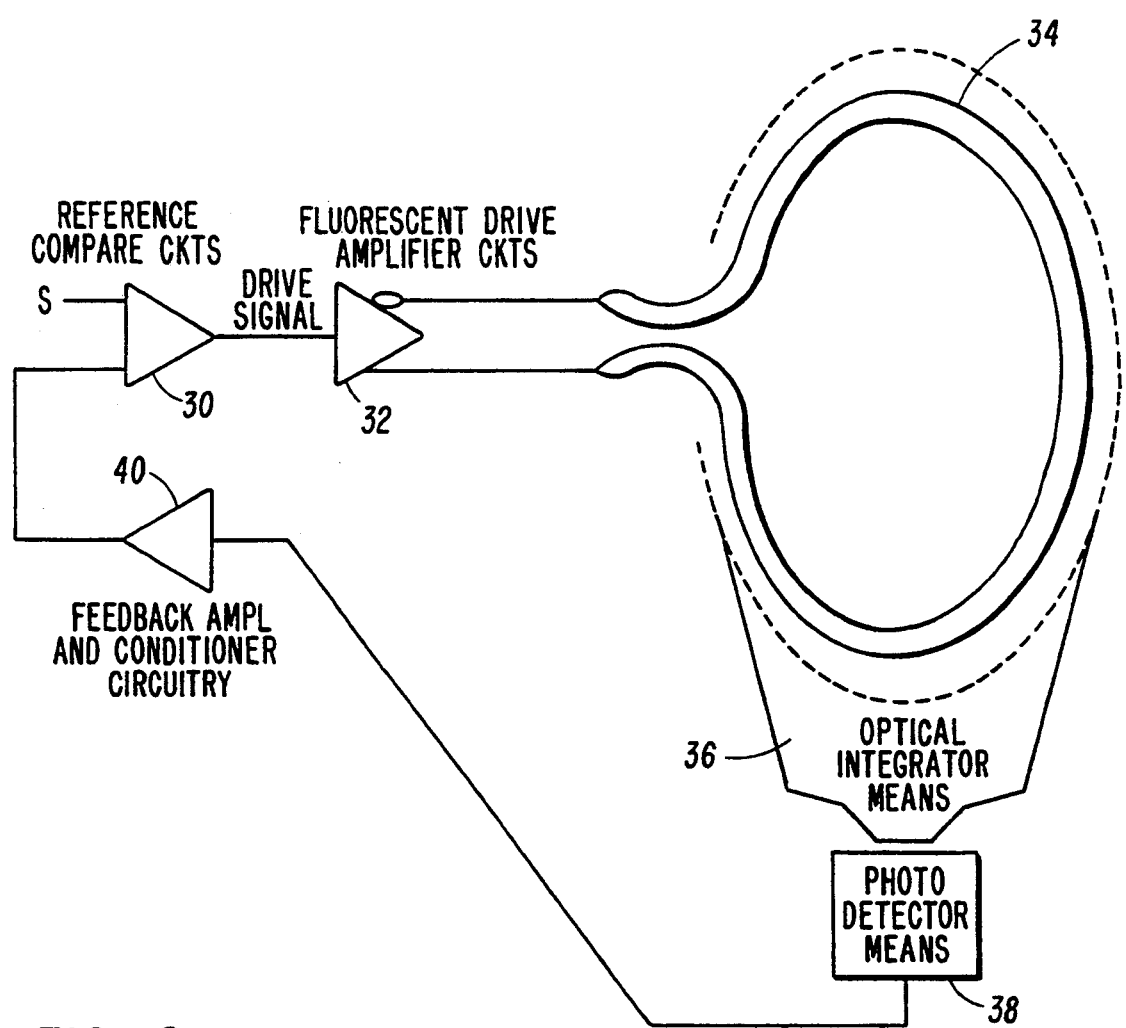
FIG. 2 is a block diagram of optical feedback as employed by the present invention.

FIG. 2 illustrates a block diagram of optical feedback as utilized by the present invention. An input signal S, representing a selected light reference voltage, is provided to reference compare circuitry 30. A drive signal is coupled from the reference compare circuitry 30 to fluorescent drive amplifier circuitry 32. The fluorescent drive amplifier circuitry 32 is coupled to and provides power for a fluorescent bulb 34. Optical integrator means 36, includes the reflector means (shown in FIGS. 1 and 3) and photodetector means 38, and monitors light intensity emitted from the fluorescent bulb 34. Although shown to be located on one edge of the fluorescent bulb 34, it is understood that photodetector means 38 may be located as desired or design requirements mandate. Photodetector means 38 is coupled to feedback amplifier and conditioner circuitry 40 and in turn as a second input to the reference compare circuitry 30.

In operation, a user selects a desired light intensity represented by signal S which is subsequently converted into the drive signal via the reference compare circuitry 30. The drive signal is coupled through the fluorescent drive amplifier circuitry 32 and energizes the fluorescent bulb 34. As light from the fluorescent bulb 34 varies in intensity, a portion is selectively monitored via the optical integrator means 36. The optical integrator means 36 provides an input signal to the reference compare circuitry 30, via the photodetector means 38 that in combination with the user selected light intensity (signal S) yields a variable drive signal adjusted as instantaneous conditions dictate.

Figure 3:
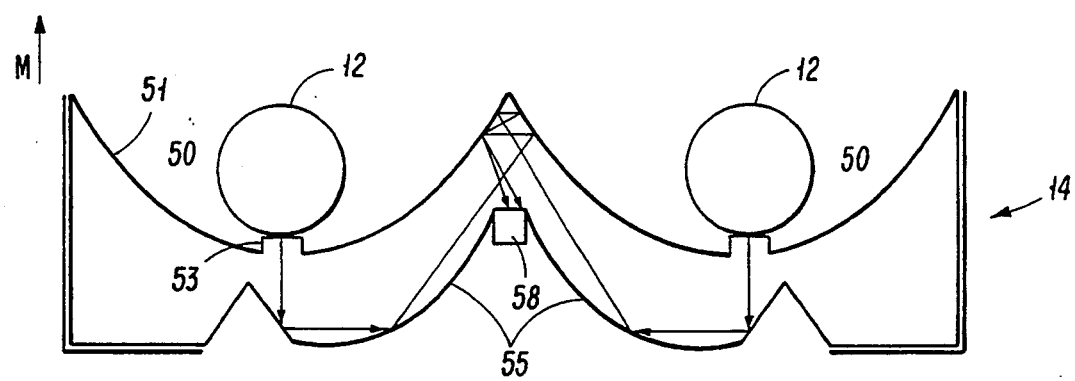
FIG. 3 is a cross-section view of an apparatus that illustrates the teachings of the present invention.

FIG. 3 illustrates a partial cross section view of device 10 along line 3 of FIG. 1. The reflector assembly 14 is shown having a general parabolic shape thereby forming a recessed area 50. The fluorescent bulb 12 rests within the recessed area 50. Although generally shown as two symmetrical parabolic segments each having a portion of the fluorescent bulb 12 within its area, it is understood that the area described by the fluorescent bulb 12 may be thought of as a circular torus accommodated along its length by the reflector assembly 14.

The reflector assembly 14 has an upper member 51, a pedestal 53, a bottom member 55 and photodetector means 58. The pedestal 53 is strategically located on the low point of the parabolic curve generally forming the upper surface 51. In operation, upper member 51 distributes light uniformly towards the LCD (See FIG. 1) as depicted by arrows M. The pedestal 53 supports the fluorescent bulb 12. The upper member 51 may be comprised of any suitable lightweight reflective material, such as aluminum or polycarbonate. A reflective coating is applied to all portions of the upper member 51 by means well known to those skilled in the art. It is not necessary to apply reflective coating material to the portion of the pedestal in direct contact with the fluorescent bulb 12.

Figure 4:
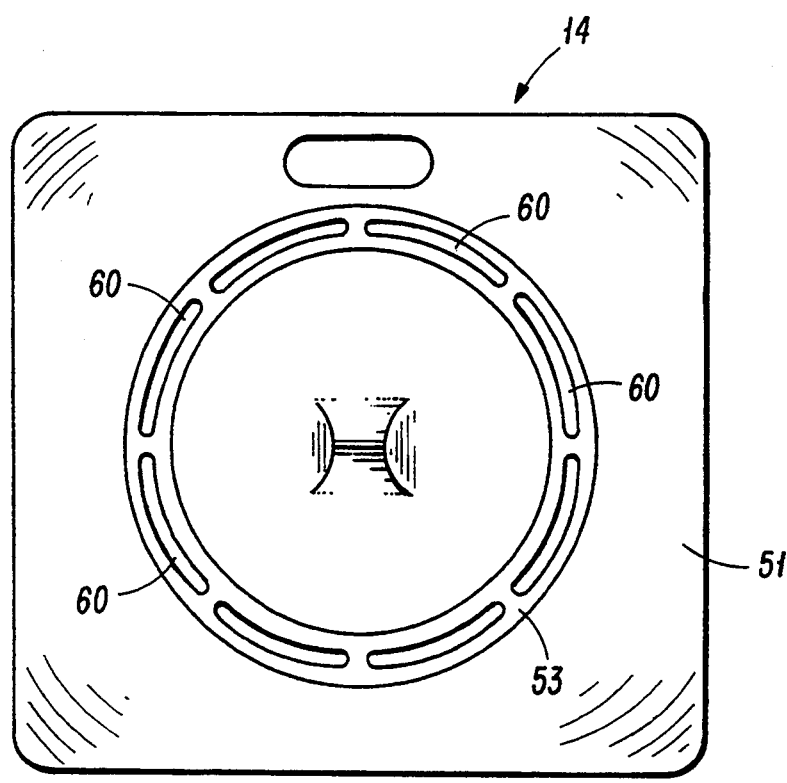
FIG. 4 is a top plan view of the reflector assembly of FIG. 3.

The pedestal 53 has a plurality of openings 60, such as slits or the like on its surface in contact with the fluorescent bulb 12 that allows light passage to the bottom of reflective assembly 14 as depicted in FIG. 4. The openings 60 could even be a continuous slit along the entire length of the fluorescent bulb 12. Bottom member 55 is contoured so as to precisely align light rays to the photodetector means 58. The photodetector means 58 may be any suitable device responsive to the photoelectric effect such as photodiodes, photoresistors or the like. As shown, an angled surface 59 is proximately located beneath the pedestal means 53 and works in combination with additional curved reflective surfaces on the bottom member 55 and the underside of the upper member 51 in order to route emitted light to photodetector means 58. Photodetector means 58 is generally located at the centroid of the reflector assembly 14.

The light passing through the pedestal openings 60 is systematically reflected to photodetector means 58 by utilization of the curved surfaces 59 on bottom member 55 in combination with the under surface of the upper member 51. The photodetector means 58 provides a variable signal to feedback amplifier and conditioner circuitry 40 (shown in FIG. 2) for processing a signal responsive to the difference of the desired light intensity and the instantaneous light emitted. The reference compare circuitry 30 evaluates received signal S with the output of the feedback amplifier and conditioner circuitry 40 to generate the variable drive signal. In this manner superior control in a compact setting may be accomplished.

Those skilled in the art will readily recognize that various modifications and changes may be made to the present invention without departing from the true spirit and scope thereof, which is set forth in the following claims.

I claim:

1. An apparatus for providing a variable drive signal to illumination means, the apparatus comprising:
    drive circuitry means for energizing the illumination means;
    optical integration means including a reflective encasement assembly and an integrated photodetector for monitoring instantaneous emissions of the illumination means wherein the reflective encasement has a parabolic shape for accommodating a circular torus shaped illumination means, and a pedestal having a plurality of openings for allowing light to be directed to the photodetector; and detector circuitry coupled to the optical integration means and an input reference signal representative of a desired light intensity;

wherein the detector circuitry output signal is responsive to the detected illumination emission.

2. An apparatus for providing a variable drive signal to a backlight illumination means having a reflective assembly and a multi-walled encasement device, the apparatus, comprising:

drive circuitry means for energizing the backlight illumination means;

optical integration means including an integrated photodetector for monitoring instantaneous emissions of the illumination means and;

detector circuitry coupled to the optical integration means and an input reference signal representative of a desired light intensity;

wherein the detector circuitry output signal is responsive to the detected illumination emission.

3. An apparatus for providing a variable drive signal to a device having illumination means and a backlit surface, the apparatus comprising:

reflector assembly means proximately located to the illumination means;

support means located on the reflector assembly means for supporting the illumination means;

sampling means located on the support means for allowing a small portion of illumination means emission to be directed away from the backlit surface;

photodetector means for receiving the sampled illumination means emission; and drive circuitry means that generates a variable drive signal for the illumination means and that is responsive to the photodetector means.

4. The apparatus of claim 3 wherein the photodetector is comprised of a single photodetector device centrally located with respect to the illumination means in order to receive light from the entire length of the backlight illumination means.

5. The apparatus of claim 3 wherein the reflector assembly is comprised of an upper contoured member and a lower contoured member for routing the sampled illumination means emissions to the photodetector.

6. The apparatus of claim 5 wherein the upper and lower contoured members are comprised of polycarbonate material with an applied reflective coating material.

7. The apparatus of claim 5 wherein the upper and lower contoured members are comprised of aluminum material with an applied reflective coating material.

8. The apparatus of claim 3 wherein the sampling means is comprised of a pedestal for the illumination means said pedestal having an opening along the entire length of the illumination means.

* * * * *